June 14, 1932. F. J. WATTS 1,862,729
ASSEMBLING DEVICE
Filed Aug. 8, 1930
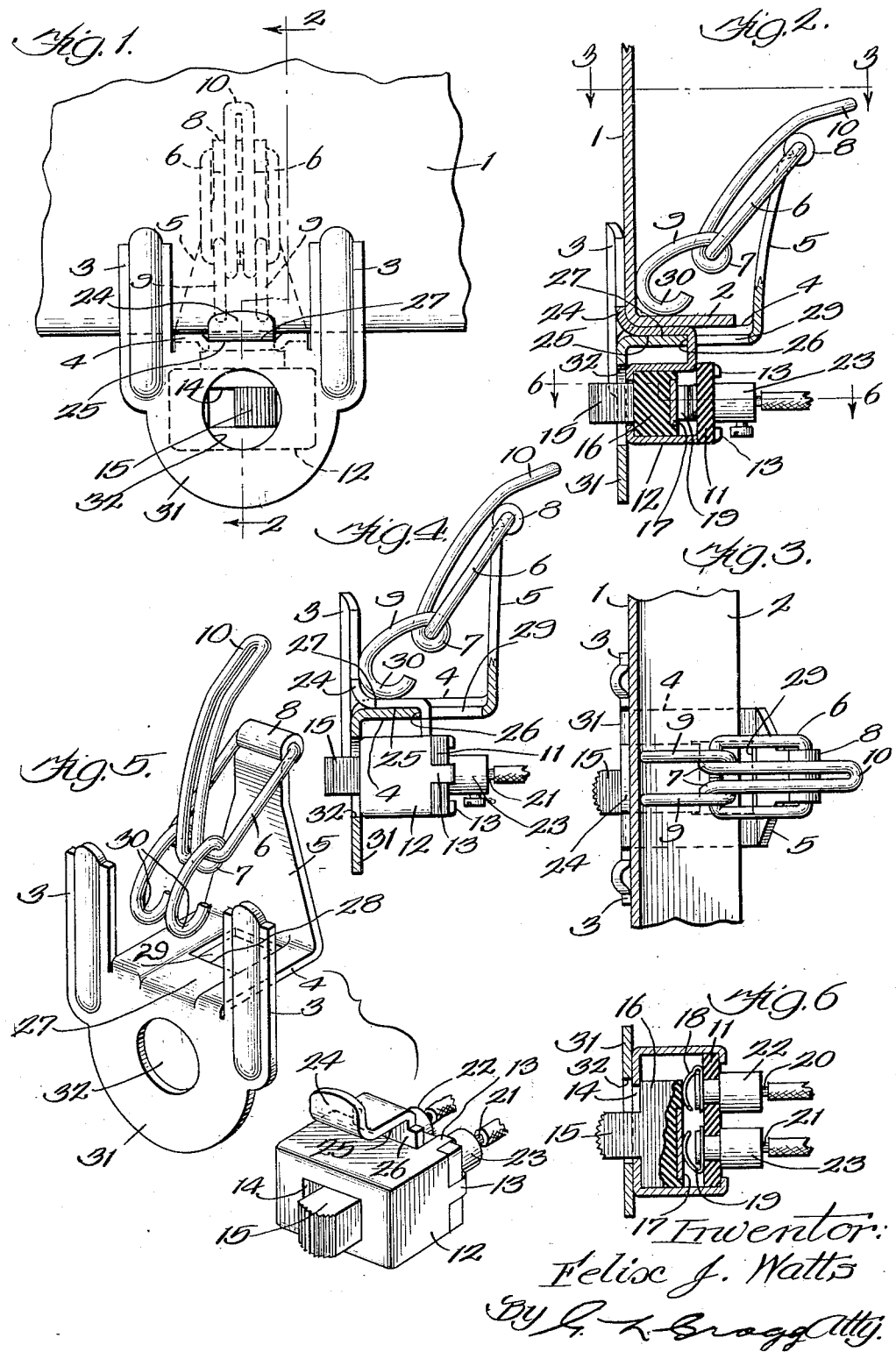

Patented June 14, 1932

1,862,729

UNITED STATES PATENT OFFICE

FELIX J. WATTS, OF BRONSON, MICHIGAN, ASSIGNOR TO HARRY A. DOUGLAS, OF BRONSON, MICHIGAN

ASSEMBLING DEVICE

Application filed August 8, 1930. Serial No. 473,820.

My invention relates to assembling devices which employ mounting brackets and clamping members upon the brackets, the invention being particularly useful in connection with the mounting bracket disclosed in the application of Earl W. Dolamore, Serial No. 463,342, filed June 23, 1930.

In carrying out my invention I provide the mounting bracket with two angularly related abutments and provide the object or member that is to be mounted upon the bracket also with two angularly related abutments that are respectively engageable with the abutments of the bracket. A single clamping device is provided upon the bracket and is so positioned with respect to said member as to maintain the abutments on this member respectively in engagement with the abutments on the bracket. The structure of my invention eliminates fastening screws or other attaching devices, supplied in addition to the clamping device, for holding the mounted object in assembly with the bracket. The structure of my invention is of particular service for mounting objects upon the dash boards of automotive vehicles, though the invention is not to be limited to any particular use.

The invention will be more fully explained in connection with the accompanying drawing in which Fig. 1 is a view, in elevation, illustrating a portion of an automotive vehicle dash board having the preferred form of the device of my invention applied thereto; Fig. 2 is a sectional view on line 2—2 of Fig. 1; Fig. 3 is a sectional view on line 3—3 of Fig. 2; Fig. 4 is a view similar to Fig. 2 with the dash board omitted and the mounted member appearing in elevation; Fig. 5 is a perspective view of the preferred form of bracket and of one object or member to be mounted thereon; and Fig. 6 is a sectional view on line 6—6 of Fig. 2.

As my invention was initially designed for use in conjunction with an automotive vehicle dash board, I have illustrated such a dash board which is inclusive of an upright body portion 1 and a ledge 2 margining the bottom of the board. The assembling device in the embodiment of the invention illustrated is inclusive of a generally U-shaped bracket, as viewed in Figs. 2 and 4, one of the bracket sides being divided into two fingers 3 from which the bracket base 4 extends to the single finger or bracket branch 5 constituting the other side of the bracket. This bracket constitutes one member of the assembling device, a second member of the assembling device being preferably in the nature of a toggle lever having one of its sections 6 pivoted to the upper end of the finger or bracket branch 5, the elbow 7 of the lever intervening between the finger 5 and the fingers 3, and overlying the bracket base 4. The lever section 6 is desirably made of wire folded into a rectangle with one of the rectangle sides encircled by the eye 8 that is formed in the upper end of the finger 5, thereby constituting a bearing for said lever section. The other section 9 of the toggle lever is desirably also formed of wire which is wrapped about the side of the section 6 opposite said eye. The wire of which the lever section 9 is made may be also inclusive of a handle 10 in one piece with section 9, this handle being provided for conveniently manipulating the lever. Any object suited to the dash board and the carrying capacity of the bracket may be mounted upon the bracket without the use of any attaching device in addition to the clamping device. The object illustrated is an electrical switch that is inclusive of a contact carrying insulating plate 11 which constitutes a closure for one side of the metallic switch casing 12, this casing being provided with prongs 13 which are clinched into holding engagement with said insulating plate. The opposite side of the casing is formed with an opening 14 therethrough through which a handle 15 extends. This switch handle is integrally formed with an insulating block 16 which carries a contacting metallic plate 17. The insulating plate 11 carries two leaf spring contacts 18 and 19 which are respectively electrically connected with the circuit conductors 20 and 21 through the intermediation of terminals 22, 23 that are riveted into assembly with the plate 11 and with said leaf spring contacts. When the handle 15 is in the position shown the contact plate 17 is in engagement with only one of the leaf spring contacts, the contact 19. When the handle occupies its alternative position this contact plate engages both contacts 18 and 19 to close the gap thereat in the circuit that contains the wires 20 and 21. In order that such a switch or other object may be mounted in accordance with my invention, I provide an attaching member therefore which will cooperate with the bracket and clamping device for the purpose stated. The attaching member 24 illustrated is an integral continuation of a wall of casing 12. This attaching member has two angularly related abutment portions 25 and 26 which are respectively engageable with two similarly angularly related abutment portions 27 and 28 that are provided upon the bracket branch or base 4. As illustrated, this bracket branch is formed with an opening 29 through which the member 24 is projected and manipulated into the position it is to occupy. The forward end of the attaching member 24 is desirably curled to receive the bottom corner of the dash board when the assembly is to be effected with such dash board or to directly receive the curled end 30 of the clamping lever which either enters the corner defined by the curled end of the member 24, as illustrated in Fig. 4, or the corner defined by the body of the dash board and its ledge. This curled end of the member 24 thus constitutes a stop that engages the toggle lever or the dash board so as to insure the engagement of the abutments 26 and 28. In either case, when the handle 10 is downwardly pressed the lever end 30 forces the aforesaid abutments upon the attaching member against the abutments complemental thereto that are upon the bracket. The bracket is desirably made of spring metal, so that the bracket side or branch 5 will effectively cooperate with the clamping lever or device to exert the desired spring pressure for maintaining the parts in assembly.

The branch of the bracket which carries the abutments 27 and 28 is desirably downwardly continued to form an apron 31 behind which the major portion of the mounted object may be concealed and which is provided with an opening 32 therethrough through which a part of the mounted object, such as the switch handle 15, may extend for accessibility. It is to be observed that the clamping lever or device is mounted upon one side or branch 5 of the bracket and extends diagonally toward the opposite side of the bracket and the bracket base. The single clamping lever thus disposed serves to perform the double function of bringing both abutments upon the attaching member into holding engagement with the complemental abutments upon the bracket. While the member 24 is illustrated as being provided for the purpose of assembling another object with the bracket and the dash board, yet it is apparent that the purpose of the invention will be served if the member 24 were the only object which is to be assembled with the bracket.

Changes may be made without departing from the invention.

Having thus described my invention, I claim:

1. The combination with a spring metal mounting bracket having two angularly related abutments; of a member also having two angularly related abutments that are respectively engageable with the abutments of the bracket; and a single spring metal clamping device upon the mounting bracket and positioned with respect to said member to maintain the abutments of this member respectively in engagement with the abutments on the bracket.

2. The combination with a spring metal mounting bracket having two angularly related branches, one of these branches furnishing two angularly related abutments; of a member also having two angularly related abutments that are respectively engageable with the abutments of the bracket; and a single spring metal clamping device upon the other branch of the bracket and positioned against the tension of said springs with respect to said member to maintain the abutments of this member respectively in engagement with the abutments on the bracket.

3. The combination with a mounting bracket having two angularly related abutments; of a member also having two angularly related abutments that are respectively engageable with the abutments of the bracket; and a single clamping device upon the mounting bracket and positioned with respect to said member to maintain the abutments of this member respectively in engagement with the abutments on the bracket, said bracket having an apron extending from the abutment bearing branch of the bracket, this apron having an opening therethrough and said member having a part projecting through said opening.

4. The structure of claim 2 wherein the member terminates in a curled end which laps the clamping device adjacent the abutments to cooperate with the clamping device to secure the engagement of the abutments.

5. The structure of claim 3 wherein the member terminates in a curled end which laps the clamping device adjacent the abutments to cooperate with the clamping device to secure the engagement of the abutments.

In witness whereof, I hereunto subscribe my name.

FELIX J. WATTS.